(12) United States Patent
Joanyr de Barros et al.

(10) Patent No.: US 12,161,065 B2
(45) Date of Patent: Dec. 10, 2024

(54) AUTOMATIC GRAIN PROCESSING APPARATUS AND LOAD MONITORING AND TRACKING SYSTEM

(71) Applicant: IMPERIO ASSESSORIA EM INFORMACOES LTDA, Sao Paulo (BR)

(72) Inventors: Sergio Joanyr de Barros, Sao Paulo (BR); Maria Angela Prates, Sao Paulo (BR); Lucas Luz Duarte, Sao Paulo (BR); Sergio Yokogawa, Sao Paulo (BR)

(73) Assignee: Imperio Assessoria Em Informacoes LTDA, Sao Paulo (BR)

( * ) Notice: Subject to any disclaimer, the term of this patent is extended or adjusted under 35 U.S.C. 154(b) by 784 days.

(21) Appl. No.: 17/413,829

(22) PCT Filed: Dec. 21, 2018

(86) PCT No.: PCT/BR2018/000080
§ 371 (c)(1),
(2) Date: Jun. 14, 2021

(87) PCT Pub. No.: WO2020/124174
PCT Pub. Date: Jun. 25, 2020

(65) Prior Publication Data
US 2022/0015296 A1    Jan. 20, 2022

(51) Int. Cl.
*A01F 12/00* (2006.01)
*A01F 12/44* (2006.01)
(Continued)

(52) U.S. Cl.
CPC .......... *A01F 12/442* (2013.01); *A01F 12/446* (2013.01); *B07B 1/22* (2013.01); *F26B 17/28* (2013.01); *F26B 2200/06* (2013.01)

(58) Field of Classification Search
CPC ........ A01F 12/44; A01F 12/442; A01F 12/46; A01F 12/48; A01F 12/60; B07B 1/00;
(Continued)

(56) References Cited

U.S. PATENT DOCUMENTS 2,183,511 A    12/1939  Bookwalter
4,021,929 A *   5/1977  Black .................. F26B 23/001
                                               56/12.2
(Continued)

FOREIGN PATENT DOCUMENTS

BR    PI0515783 A    8/2008
BR    PI0902573 A2   4/2010
(Continued)

OTHER PUBLICATIONS

International Search Report dated Jul. 10, 2019 in International application No. PCT/BR2018/000080.

*Primary Examiner* — Chi Q Nguyen
(74) *Attorney, Agent, or Firm* — Baker & McKenzie LLP (57) ABSTRACT

Disclosed are systems and apparatuses for processing agricultural and other grains. The systems and apparatuses include integrated units for cleaning, drying, weighing, classifying, packaging, labelling, tracking, and load monitoring of grains. In some embodiments, the systems and apparatuses include a cleaning unit for depositing and sifting grains, a drying unit for moving grains through a hot environment, a grain weighing and classification unit, and a packaging and labelling unit for vacuum sealing and labelling grains, all in one integrated unit.

27 Claims, 13 Drawing Sheets

(51) Int. Cl.
  *B07B 1/22* (2006.01)
  *F26B 17/28* (2006.01)
(58) Field of Classification Search
  CPC ... B07B 1/22; B07B 1/24; F26B 17/28; F26B 17/00; F26B 17/002; F26B 2200/00; F26B 2200/06; F26B 2210/00
  See application file for complete search history.

(56) References Cited

U.S. PATENT DOCUMENTS

| | | | |
|---|---|---|---|
| 4,312,750 A | | 1/1982 | Braun |
| 4,846,198 A | * | 7/1989 | Carnewal ............... A01D 41/00 460/68 |
| 5,105,563 A | * | 4/1992 | Fingerson ............. F26B 19/005 56/16.6 |
| 5,557,859 A | * | 9/1996 | Baron ................... F26B 21/083 34/512 |
| 6,125,617 A | * | 10/2000 | Villers ................... A01F 29/09 56/2 |
| 8,141,328 B2 | | 3/2012 | Villers |
| 10,076,081 B2 | * | 9/2018 | Verhaeghe ............. A01F 15/046 |
| 10,670,338 B2 | * | 6/2020 | Wingard, Jr. ........... F26B 9/063 |
| 10,746,632 B2 | * | 8/2020 | Petty, Jr. .............. A01D 46/085 |
| 11,712,003 B2 | * | 8/2023 | Groth .................. A01D 43/003 56/361 |
| 2013/0291507 A1 | * | 11/2013 | Williams ............... A01D 46/08 56/13.5 |
| 2014/0075776 A1 | * | 3/2014 | Potter .................. F26B 21/083 34/232 |
| 2019/0116733 A1 | * | 4/2019 | Wire ................... A01D 43/085 |

FOREIGN PATENT DOCUMENTS

| | | |
|---|---|---|
| CN | 2370362 Y | 3/2000 |
| CN | 201910053 U | 7/2011 |
| CN | 105469228 A | 4/2016 |
| GB | 842684 A | 7/1960 |

* cited by examiner

AUTOMATIC GRAIN PROCESSING APPARATUS AND LOAD MONITORING AND TRACKING SYSTEM

FIELD OF THE INVENTION

The present invention refers to an automated processing apparatus comprising in an integrated manner the following units: cleaning, drying, weighing and classification, as well as packaging and labelling of grain. In particular, said apparatus provides greater productivity and reduction in logistical costs for the outflow of grain.

Additionally, the present invention provides a load monitoring and tracking system.

BACKGROUND OF THE INVENTION

Today, the agroindustry employs a number of apparatuses that independently perform each stage of processing and storage of grain, resulting in a significant impact on the costs of implementation and operation of the system.

It is known that the silage operation requires the packaging of agricultural products in a dry environment, isolated from the external environment and in adequate temperature and moisture. This implies the use of automated or manual controls of cleaning, dehumidification and adjustment of temperatures, allowing storage for long periods of time.

However, although the stages of processing and storage of grain have a very important role for agricultural production, given the high productivity presented by the agroindustry in recent years, there is often a lack of adequate locations for the storage of these loads, resulting in the loss of the crop by the producer and the abuse of prices by outsourcing this service.

In this sense, some producers who have chosen to carry out drying, cleaning and storage of grain stages on the farm itself, reported advantages, such as, reductions in crop losses due to the delay of harvesting and accommodation of products in inappropriate locations, reduction of freight costs, freedom to market their products, among others.

The documents U.S. Pat. Nos. 2,183,511A, 4,312,750A, CN2370362 and U.S. Pat. No. 8,141,328 disclose systems comprising the processing stages required for agricultural products. However, it turns out that such systems are applied independently, that is, there is no interconnection between the necessary stages.

North American patents comprising U.S. Pat. Nos. 2,183,511A and 4,312,750A disclose a cleaning system of the grains, where it is possible to remove impurities with different sizes and shapes, rotating cylindrical screens with different diameters of holes to sort the grains from impurities.

The Chinese patent No. CN2370362 discloses a model for drying of mobile grain that can be used in harvesting, a cylindrical drying chamber, composed of a permeable material in the form of a net, a horizontal drill, a gas burner and a manual control mechanism.

To characterize the storage of bagged grain, patent U.S. Pat. No. 8,141,328 discloses a system and a method for autonomous airtight bulk merchandise storage, formed by a thin, lightweight, waterproof material that is resistant to ultraviolet rays, winds and rodents.

As can be observed, the documents described here disclose systems that act independently, that is, perform only one of the processing stages at a time, and there is no interconnection between each other, that is, as in the case of U.S. Pat. No. 8,141,328, besides requiring external apparatuses to perform processing, it is not possible to transport the load on the inside.

As known, the quality assurance of the grains during the stocking and flow operations of production, which are usually carried out in outsourced load warehouses, is directly linked to the parameters of temperature and moisture of the grains.

In order to solve such problems, the present invention provides an automated processing apparatus and in an integrated manner, that is, in a single apparatus, the stages of cleaning, drying, weighing and classification of the grains, as well as packaging and labelling, dispensing with the use of intermediate processes.

Additionally, the present invention provides a system for monitoring the properties of the grains, such as, for example, temperature and pressure, as well as trackability, that is, location of the load for monitoring by the end client.

The present invention provides the following advantages:
 freedom of choice in the marketing of products, aiming at more attractive prices and conditions;
 reduction of some stages in the logistics of grain, since the load will be packed and already classified, making the process faster and effective;
 higher yield for the farmers because it does not require immediate transport or specific location for storage;
 avoids the fees and discounts charged for deposited products in third-party warehouses;
 reduction of the port bottleneck caused by the seasonality of the grains, since the producer will be able to market their products outside the harvest season;
 reduction of idle periods in the harvest due to the waiting of trucks, commonly held up in long waiting lines for unloading in the collection or intermediate units;
 customization and improvement of the quality of the product given the fact that the packaging contains only one producer's product, the segregation thereof thus being guaranteed, the quality and originality of GMO and NO-GMO grains being upheld, also allowing tracking thereof;
 possibility of access to new consumer markets, given the feasibility of buying products in smaller volumes;
 reduction of the use of fossil fuel as an energy source and low waste generation, and is therefore cleaner technology;
 reduction of emissions of pollutants from the burning of fossil fuels during the drying stage of the grains;
 possibility of transport door to door, since the load is packed and can remain this way until the final destination, without the need to be violated to carry out stages of storage, transshipment and transport;
 mitigation of losses and load breakdowns resulting from bulk transport, due to the multimodals currently used from origin to the final destination; and
 greater competitiveness on the international market due to reduced freight and storage costs.

BRIEF DESCRIPTION OF THE DRAWINGS

The invention can be better understood by way of the following detailed description, in line with the accompanying drawings, wherein.

DETAILED DESCRIPTION OF THE INVENTION

In the detailed description below, various specific and non-limitative details, are presented, in order to provide improved understanding of the present invention.

In a first aspect, the objective of the present invention is to provide an apparatus that is more accessible, practical and efficient.

In particular, the present invention provides an automatic grain processing apparatus (78) comprising, in an integrated manner, that is, in a single apparatus, the following units:
 a cleaning unit (2) comprising at its upper end a reservoir (1) for depositing the grains; a pair of rotary sifters with different permeabilities (3), said sifters (3) being moved through a gearing system (4), wherein said gearing system (4) is connected by way of a pulley (6) to a main rotating shaft (13);
 a drying unit comprising a dryer (18), and said dryer comprises on the inside an air distribution means (20) connected by the piping (17) to a heat source (16); a grain conveyor means (23) connected at the upper end (21) of said dryer (18); one or more moisture measurement and classification means (37); a plurality of air permeable chutes (53) arranged inside said dryer (18); a grain conveyance means (19) coupled inside said dryer (18); and a reservoir (22) comprising a door (45) and a lever (44) at its lower end;
 a grain weighing and classification unit comprising a batch flow weighing scales (27) where a portion of the dry grains will be weighed, while another portion of the dry grains will be collected by way of probes (28), classified by the automatic classifier means (29) and returned to the weighing scales (27); wherein said weighing scale (27) has at its lower end a door (48) which is activated by the door opening and closing means (31); and
 a grain packaging and labelling unit comprising:
 i. a packaging means comprising forks (33) which position and support the packaging (34) inside the mold (55) for receiving the grain load; fork support (32), wherein said fork support (32) moves by rails (35) connected at the base (36) of said support (32);
 ii. a packing securing and sealing means (46) positioned adjacently to the packaging means;
 iii. an air withdrawal means (24) of the packaging (34); and
 iv. a labeler (30), which applies a label (75) on the packaging (34).

Figure 1:
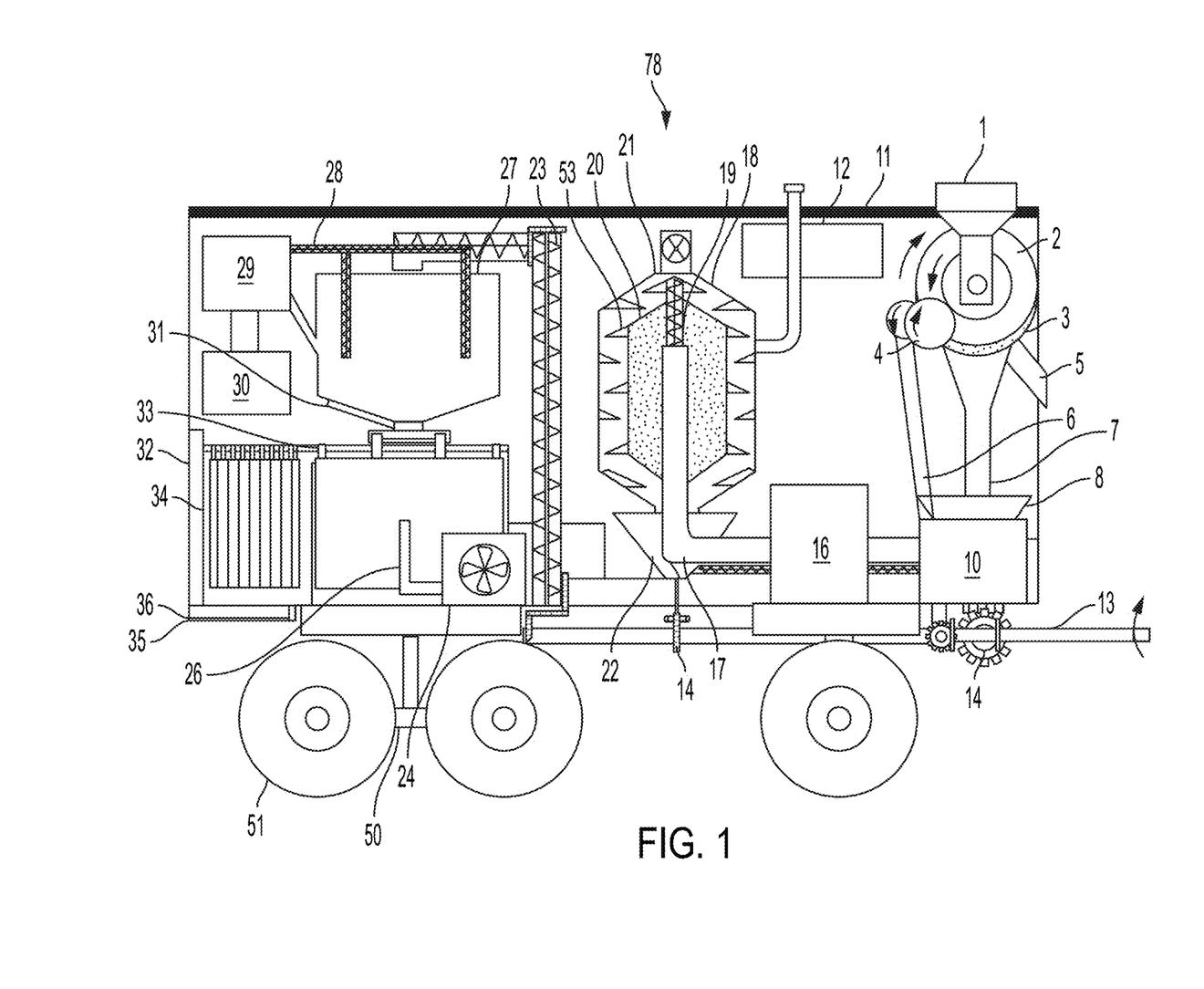
FIG. 1 represents a right side view of the apparatus of the present invention, with the units of which it is comprised.
Figure 2:
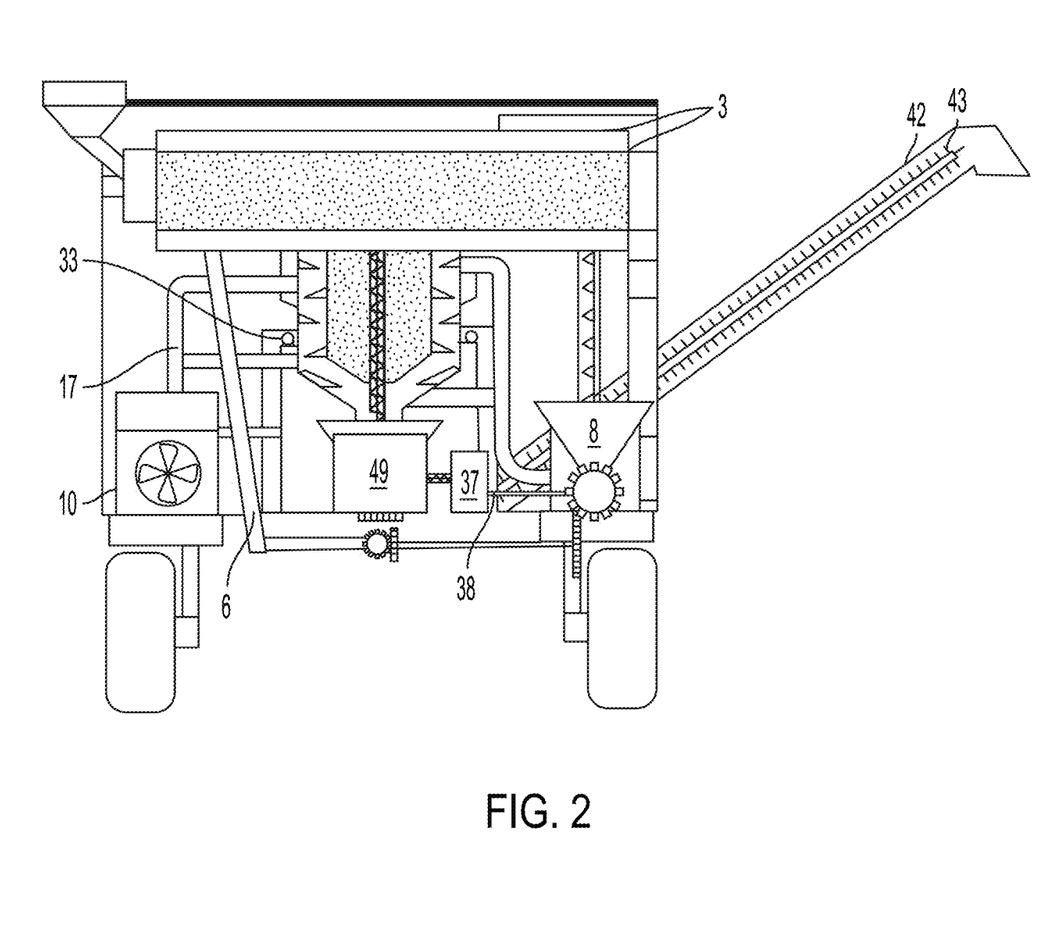
FIG. 2 represents a front view of the apparatus of the present invention.
Figure 3:
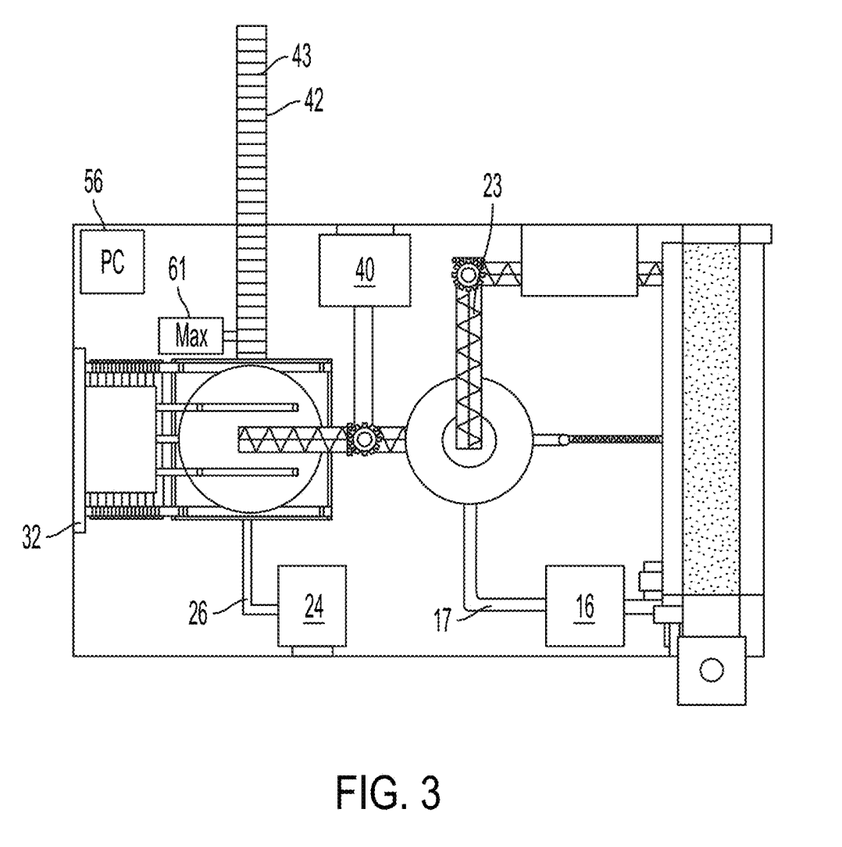
FIG. 3 represents a top view of the apparatus of the present invention.

FIGS. 1, 2 and 3 represent the apparatus of the present invention. Initially, with the assistance of a harvester or auxiliary truck, the grains harvested are deposited in the funnel (1), which directs the grains to the cleaning unit (2), in order to sort the grains from the impurities. The cleaned grains, after passing through the rotary sifters (3), are directed through the chute (7) to the grain directing means (8), where a portion of the grains will be directed to the moisture measurement and classification means (37) and another portion will be directed to the grain conveyance means (23). The impurities generated, arising from the cleaning unit, will be discarded by the chute (5) back to the soil in the form of fertilizer.

Said moisture measurement and classification means (37) is responsible for determining the temperature of the heat source (16) and the hot air outflow inside the dryer through the blower (10).

Once the grains pass through the cleaning unit (2), the portion that is considered clean is directed through the chute (7), by gravity, to the grain directing means (8), where a portion of the grains will be directed through the duct (38) to the moisture measuring means (37), which controls the temperature of the heat source (16) and the speed of the air ingestion in the dryer through the ventilation means (10), which are required for the drying unit of the grains. The largest portion of the grain that was not directed to the moisture measurement and classification means (37) will be conveyed through a grain conveyor means (23), as presented in FIGS. 4A to 4B, to the dryer (18).

Preferably, said cleaning unit of the apparatus of the present invention further comprises a grain directing means (8).

Figure 4A:
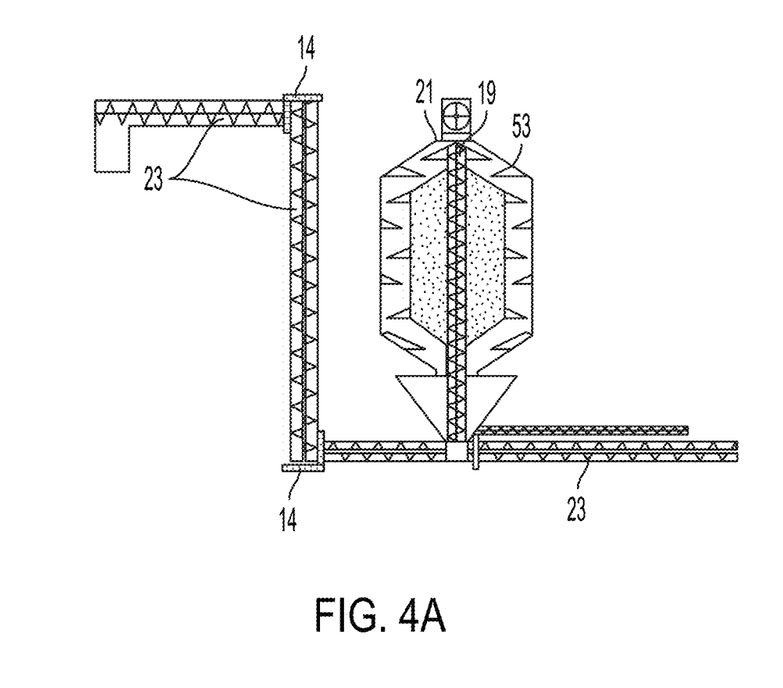
FIGS. 4A and 4B represent, respectively, a right side and frontal view of the grain drying unit comprised in the apparatus of the present invention, where it is possible to note the path the grains will take from the input to the output from the dryer (18), being carried by way of a grain conveyor means (23)
Figure 4B:
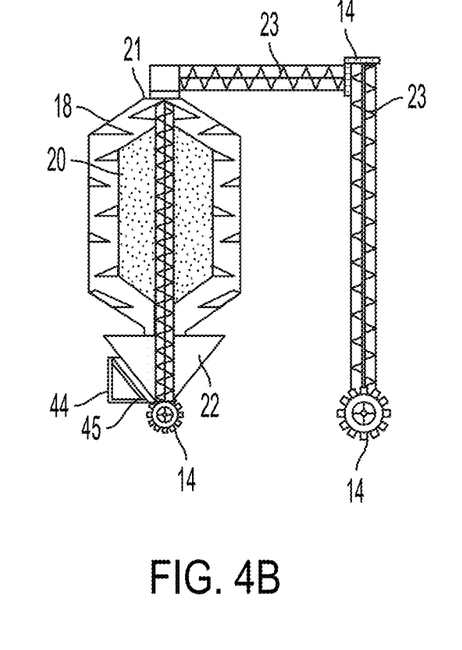

The grains will be deposited in the dryer (18) through the upper end (21), and will pass inside the dryer (18) by gravity. The air permeable chutes (53) serve to decrease the speed of the grains inside the dryer (18), in order to keep them for a longer time in contact with the heated air. In order to carrying out equal drying of the grains on the inside, the air distribution means (20) is connected by the air director (17) to the heat source (16).

After the first passage of the grains inside the dryer (18), they will be deposited in the reservoir (22), where the moisture thereof will be measured. If the desired pre-set moisture has not been achieved, the grain conveyance means (19) will convey the grains from the reservoir (22) to the upper part of the dryer (18) so that they may be dried again. The drying process is repeated as many times as necessary, until the desired moisture value is attained. Upon attaining the desired moisture value, the door (45) will be automatically opened by way of the automatic opening system (44).

Further, said drying unit of the apparatus of the present invention further comprises a ventilation means (10) and an air directing means (17).

After passing through the drying unit, the grains are conveyed by way of a grain conveyance means (23) to said weighing and classification unit (76). When the grains attain a pre-set weight, they are unloaded through the door (45) automatically activated by the automatic opening system (44).

After the drying stage, the dry grains with the required moisture value will be conveyed by the grain conveyor means (23) and cooled to ambient temperature, injecting cold air through the fan (40) arranged directly in the grain conveyance means (23), which is arranged adjacently to said dryer (18). The dry grains will be carried by way of the grain conveyor means (23) to the batch flow weighing scales (27), comprised in the grain weighing and classification unit (76).

Figure 7A:
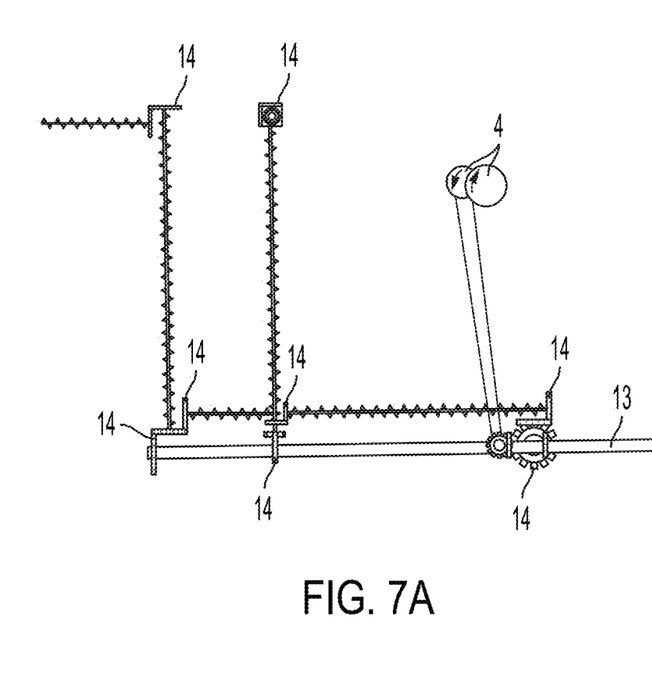
FIGS. 7A and 7B represent, respectively, a view of the right side and front of the gearing system that will be part of the mechanical movement in the grain transport operations present in the apparatus of the present invention.
Figure 7B:
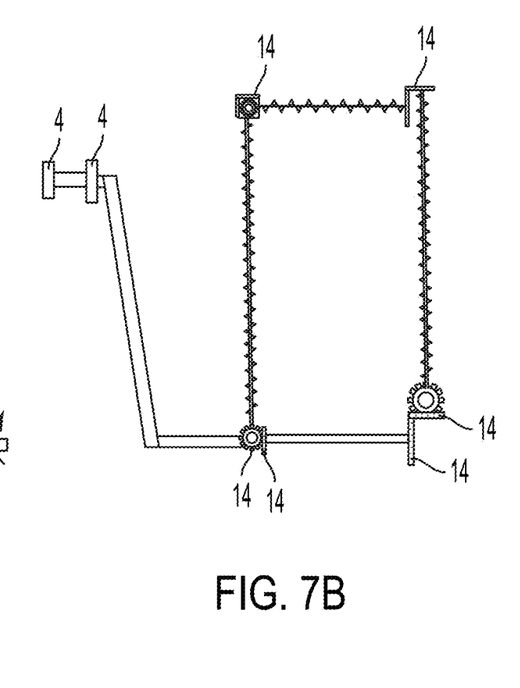
Figure 8:
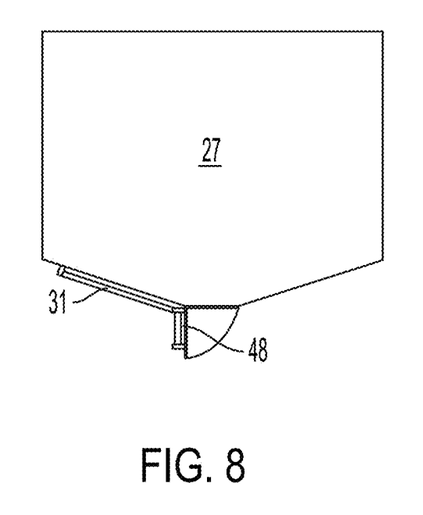
FIG. 8 represents a side view of the flow weighing scales comprised in the apparatus of the present invention.

A flow weighing scales (27) will be responsible for partitioning and weighing the fractions of grain that should be packaged. For classifying the grains in this stage, samples are taken by way of probes (28), which take these samples directly to the automatic classifier means (29), the sample portion returning to said weighing scales (27) after classification. Upon attaining the required weight, the grains will be released through the door (48), illustrated in FIG. 7, automatically activated by the door opening and closing means (31), and unloaded inside the mold (55), comprised in the packaging and labelling unit, of grain.

Thereafter, the grains, which were classified and weighed, will be deposited inside the bagging mold (55), comprised in the grain packaging and labelling unit, where the packaging (34) will be positioned for receiving these grains. Thereafter, vacuum is applied inside the packaging through the air withdrawal means (24), through the duct (26) connected to the packaging, which will subsequently be secured and/or sealed by way of a packing securing and sealing means (46).

Figure 5A:
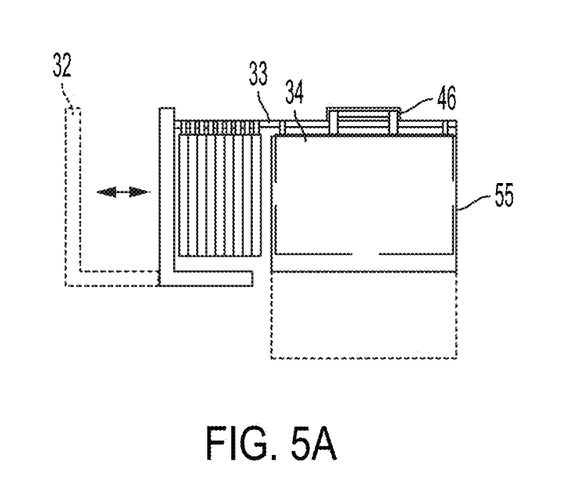
FIGS. 5A and 5B represent, respectively, a view of the right side and front of the grain packaging and labelling unit comprised in the apparatus of the present invention.
Figure 5B:
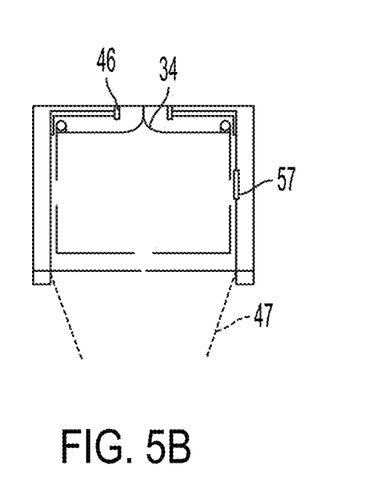

FIG. 5 illustrates a representation of the packaging and labelling unit of the grains. The forks (33) are responsible for positioning the packaging (34) inside the mold (55), and also for supporting them when they are loaded. The support for the forks (32) will be used both for supporting the forks (33), and, consequently, the packagings, and will also serve as door to replace the packagings and access the inside of the apparatus (78). Additionally, said support (32) will move by rails (35) connected to its base (36).

Figure 6:
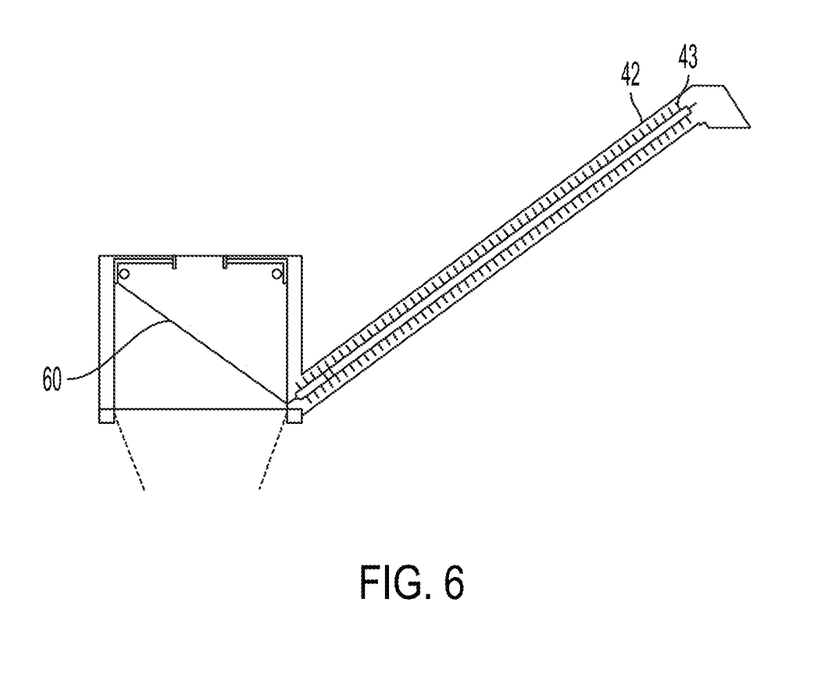
FIG. 6 represents a front view of the release operation of the grain in bulk, comprised in the apparatus of the present invention.

As can be seen in FIG. 6, the grain director (60) is used to direct the grains to the conveyor belt (42), which comprises small blades (43) that assist in conveying the grains. An electric motor (61) is used to move the belt (42) and the blades (43).

Thereafter, labelling (75) is carried out of the packaged product, that is, of the packaged grains, by way of a labeler (30) and the release of the load through the doors (47) present at the bottom of the apparatus (78). Accordingly, a reading sensor (57) is used, such as, for example, radiofrequency identification (RFID), coupled inside the mold (55) which takes the reading of the labels (75) present on the inside of the packaging (34), linking the characteristics evaluated by the automatic classifier means (29) to the packaging, to be unloaded.

According to the present invention, said labels (75) will comprise a bidimensional barcode (QR Code) and/or a chip with a radiofrequency (RFID) sensor and/or a barcode with the characteristics evaluated by the automatic classifier means (29) and/or a global positioning systems (GPS) chip. More particularly, the chip with radiofrequency (RFID) sensor of said label (75) will comprise a grain moisture and/or pressure and/or temperature and/or vacuum sensor contained in the packaging (34).

The control panel (56) is responsible for aligning the working of all the operations responsible for processing, classifying, weighing and vacuum-packing the grains, resulting in a more reliable and efficient operation. Accordingly, said control panel (56) performs an analysis through the sensors present in all the apparatuses with the intent of self-regulation of all the processing operations, such as, for example, temperature of the heater (16) and drying time. The control panel (56) is responsible for controlling the activities of all the units comprised in the apparatus of the present invention.

The rotational movement of the grain conveyor means (23) throughout the apparatus is carried out by way of sets of gearings (14) connected to the main rotating shaft (13) (illustrated in FIG. 6), latter may also be connected to the drive shaft of the very tow truck or, if the apparatus is arranged in a manner fixed to the warehouse, connected to an auxiliary motor.

In a preferred embodiment of the present invention, said apparatus comprises solar panel boards (11) arranged on its upper surface, as a source of power, the energy also being stored in batteries (12), when necessary. In a preferred embodiment, said apparatus further comprises a generator (49) capable of transforming the mechanical energy of the rotational shaft (13) into electric energy.

Additionally, in order to facilitate the movement of the apparatus of the present invention, said apparatus comprises a shaft set (50) at its lower end and one or more wheels (51) connected in a rotary manner to said shaft (50).

By way of example, and non-limitatively, of the apparatus of the present invention, in the case of bulk load, after passing through the weighing and classification unit, the grains will be released for the mold, comprising a grain director (60) which will direct the grains to the conveyor belt (42), where there will be the presence of a blade conveyor system (43), releasing the grains in bulk. Movement of the conveyor belt (42) is carried out by way of the motor (61).

In a second aspect, the present invention provides a grain integrity monitoring and tracking system, comprising one or a plurality of sensors arranged in a packaging and configured to measure the temperature and/or moisture and/or pressure and/or vacuum properties of the packaged grains, together with the location of the load; and at least one communication module configured to receive the data from said one or a plurality of sensors and configured to transmit and store the information from said one or a plurality of sensors in a cloud or any high-performance repository.

Figure 9:
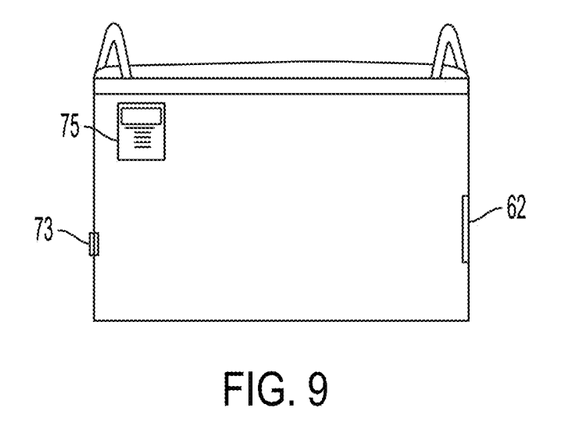
FIG. 9 represents the packaging and its components.

Preferably, said at least one communication module of the grain integrity monitoring and tracking system of the present invention comprises a processor configured to transmit the information from said one or a plurality of sensors and a wireless communications unit configured to wirelessly transmit the information from the sensor to an external computer, FIG. 9 shows the sensors arranged in the package (34), which can identify exactly how, when and where the load, that is, the packaged grains, is stored, the temperature, vacuum and pressure conditions of the grains, as well as bringing agile location responses for monitoring by the end client. The information measured by said sensors, such as temperature and/or moisture and/or pressure and/or vacuum of the packaging (34), will then be sent to and stored, in real time, in a cloud or any high-performance repository for subsequent analysis employing a logistics management software, such as, for example, the software AtlasSuíte by Império Assessoria em Informações LTDA.

Figure 10:
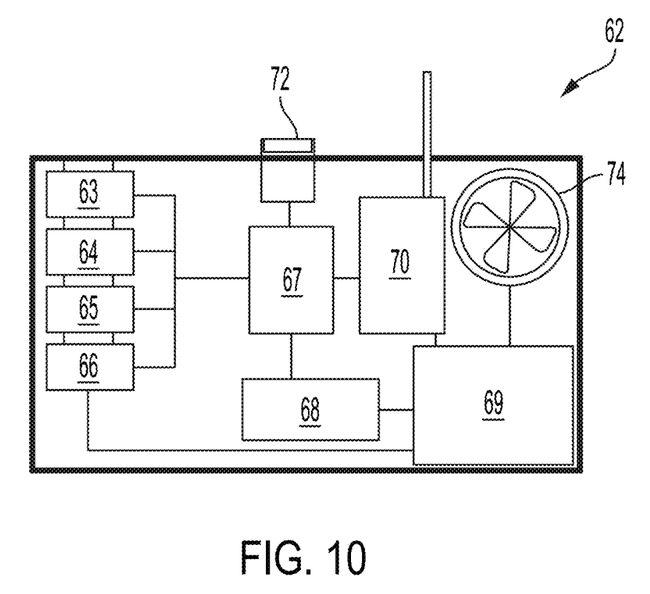
FIG. 10 represents the electronic components present on the packaging obtained by the apparatus of the present invention.
Figure 11A:
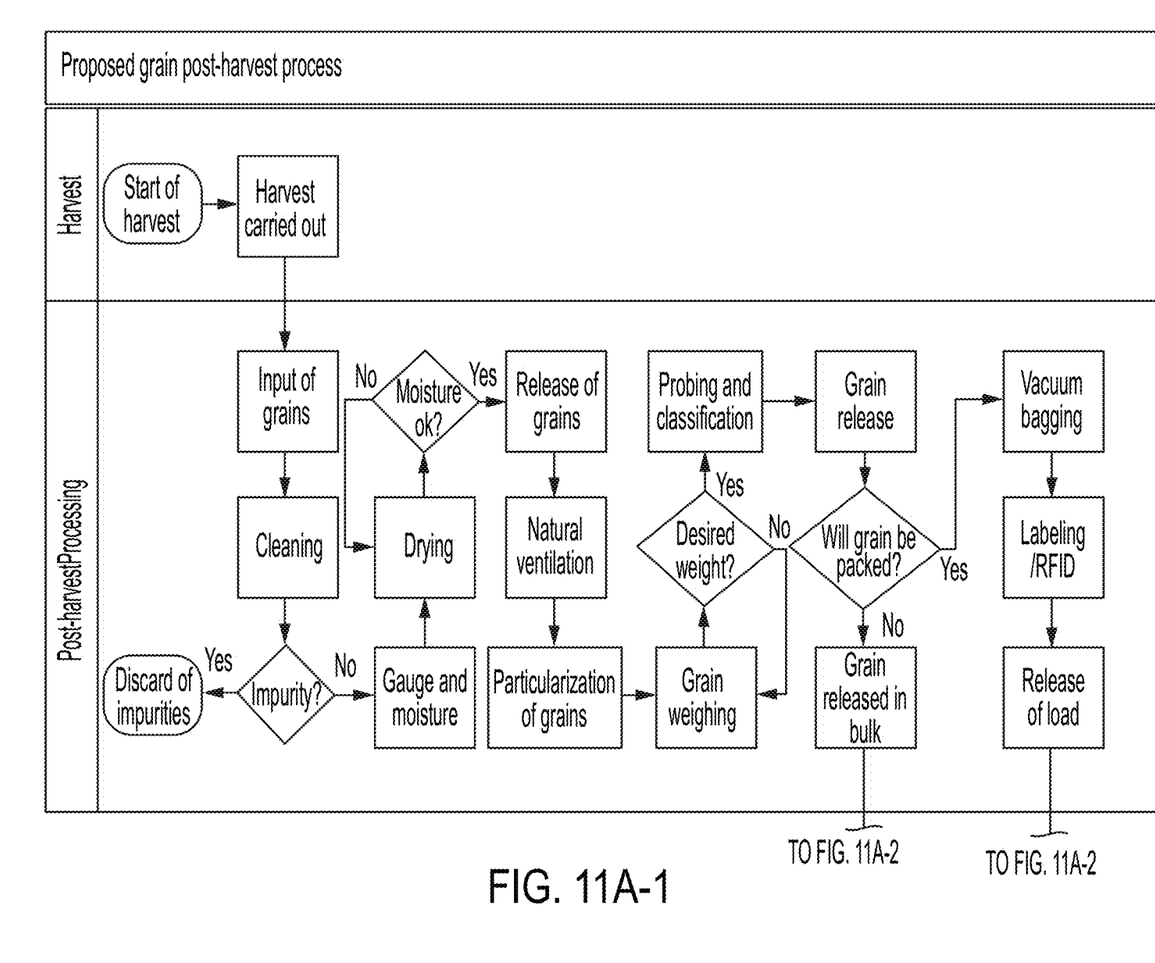
FIG. 11A represents the flowchart of the grain post-harvest process carried out by way of the apparatus of the present invention.
FIGS. 11B and 11C represent comparative flowcharts between the post-harvest stages carried out in the state of the art and the post-harvest stages employing the apparatus of the present invention.
Figure 11A:
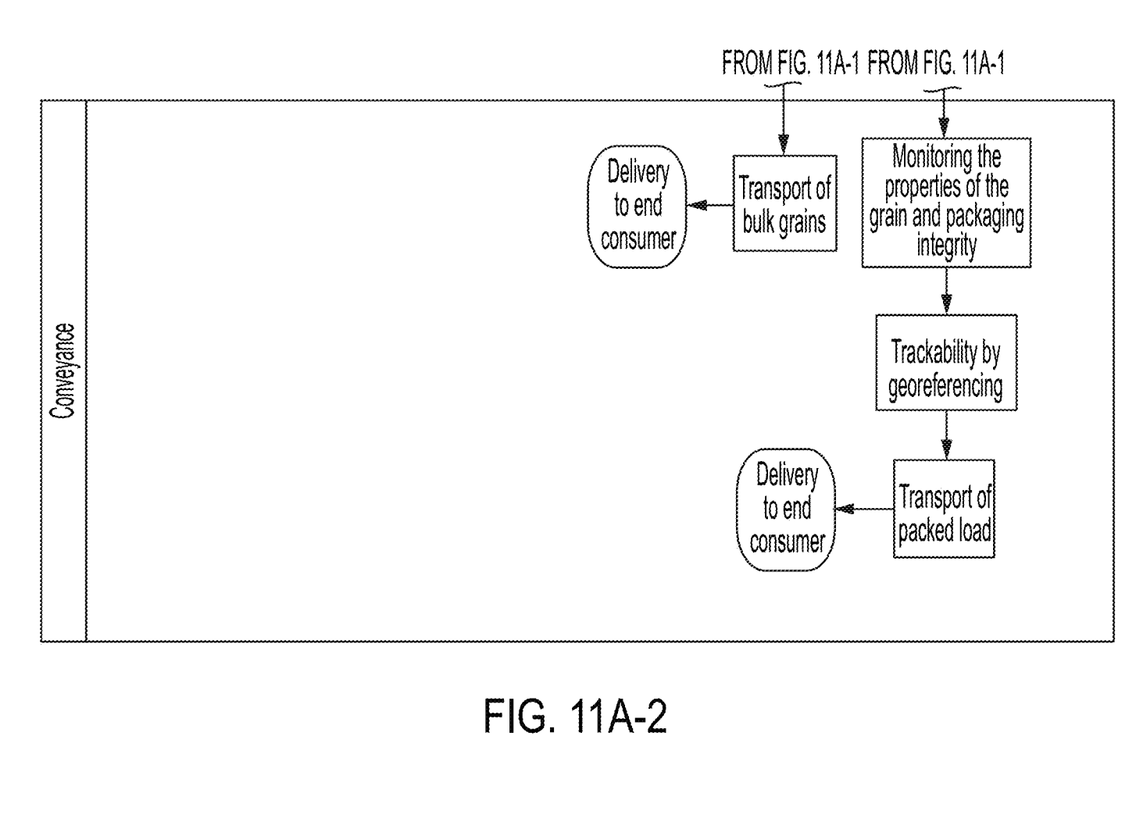
Figure 11B:
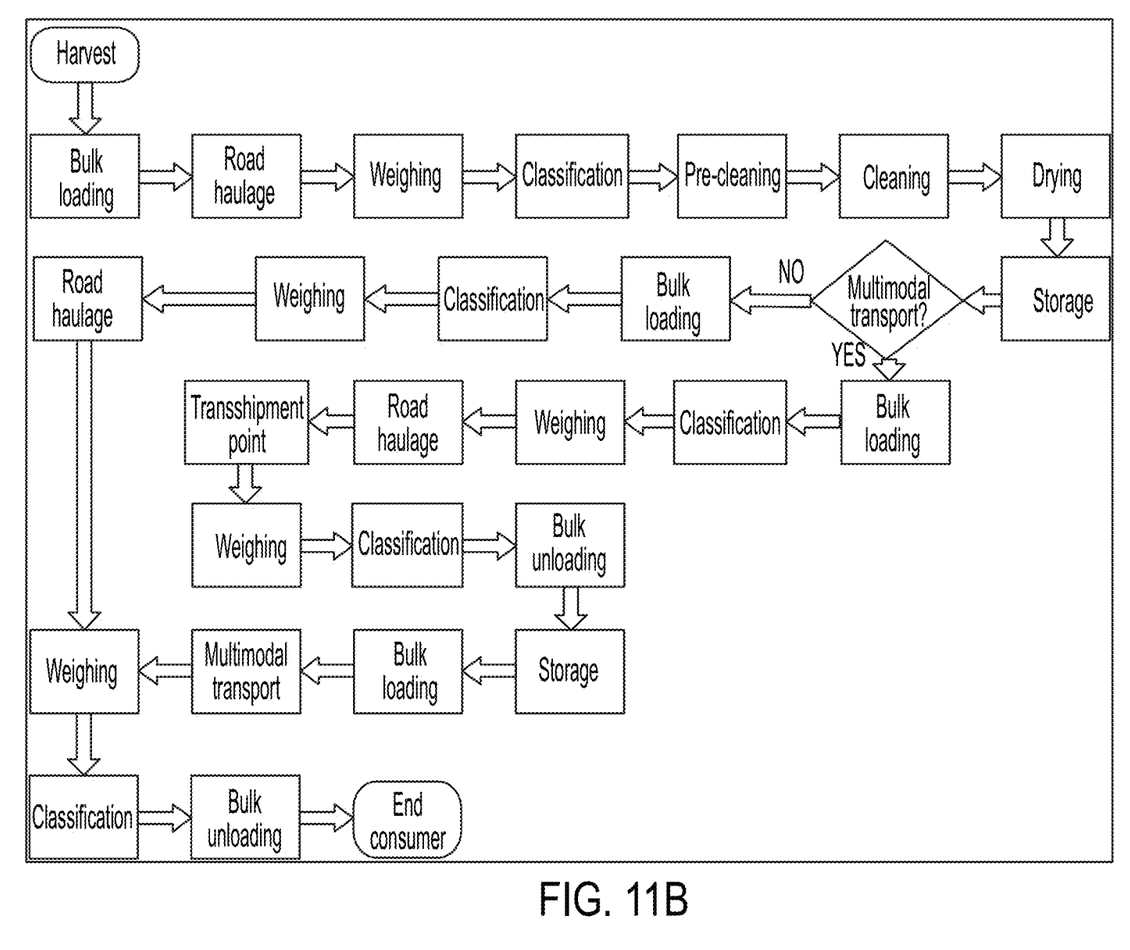
Figure 11C:
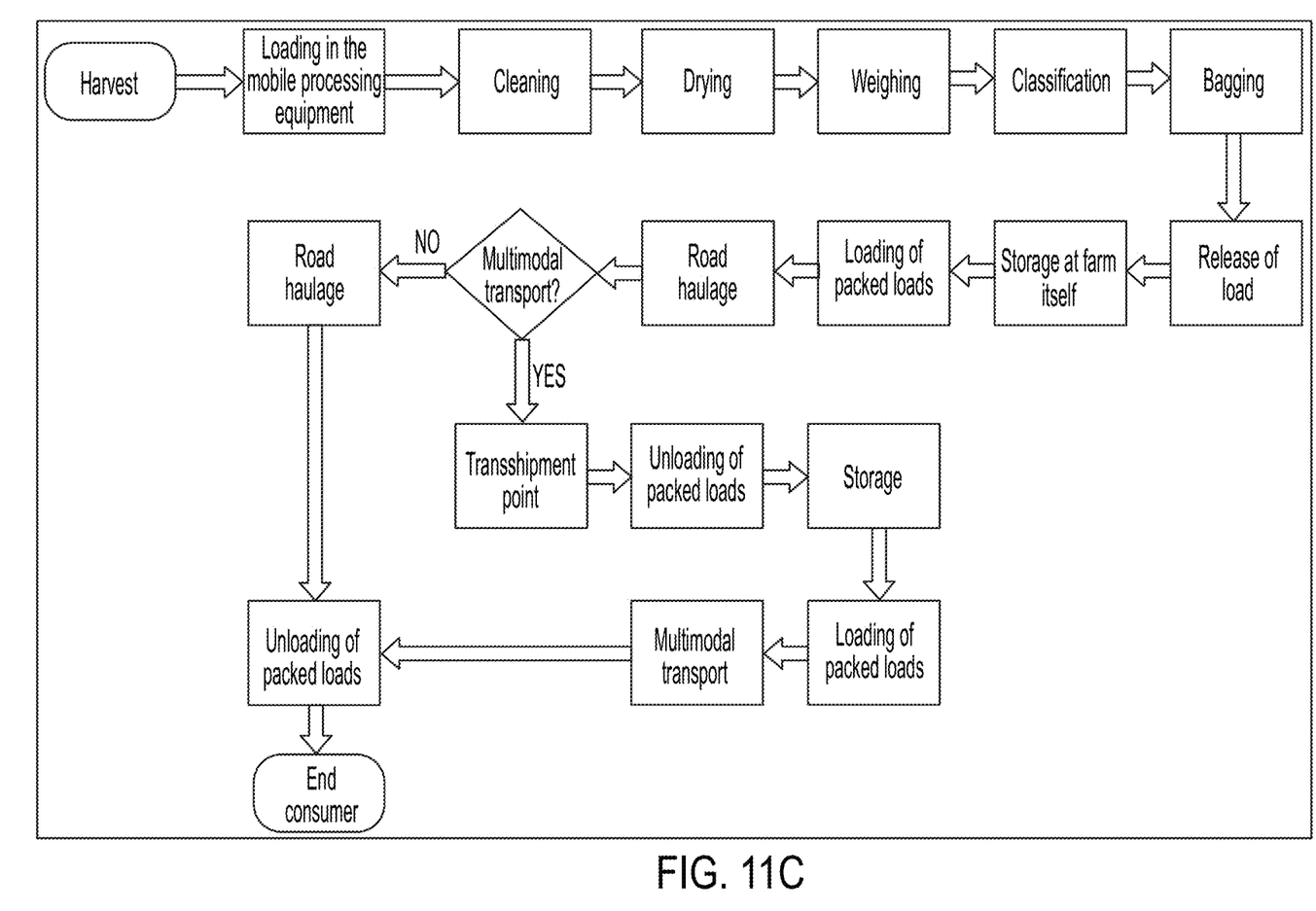

FIG. 10 illustrates in further detail the electronic components of this system, which will be comprised of moisture (66), temperature (63), pressure (64) and vacuum (65) sensors, coupled to a reduced size single board computer (62), capable of storing and sending the data to the cloud or any high-performance repository, through a log recording device (67) and a communications device for data transfer (70), respectively.

Said reduced size single board (62) will also comprise a USB (72) port for accessing the information and adjustments in loco.

Additionally, said system of the present invention comprises a global positioning systems (GPS) (68) module responsible for the geolocation of the load, a high-durability battery (69) and a fan (74) for cooling the board (62), as well as an air input and output control valve of the packaging (73).

It should be understood that although the invention has been described in detail and with reference to specific embodiments thereof, it will be obvious for persons skilled in the art that various changes and alterations could be made to the invention now claimed, without straying from the scope and spirit of the invention.

The invention claimed is:

1. An automatic grain processing apparatus (78) comprising:
 a cleaning unit (2) comprising:
  at an upper end of the cleaning unit, a first reservoir (1) for depositing one or more grains; and
  a pair of rotary sifters with different permeabilities (3), said pair of rotary sifters (3) being moved through a gearing system (4), wherein said gearing system (4) is connected by way of a pulley (6) to a main rotational shaft (13);
 a drying unit comprising:
  a dryer (18), and said dryer comprises an air distributor (20) connected by one or more pipes (17) to a heat source (16);
  a first grain conveyor (23) connected at an upper end (21) of said dryer (18);
  one or more moisture measurement and classification devices (37);
  a plurality of air-permeable chutes (53) arranged inside said dryer (18);
  a second grain conveyor (19) coupled inside said dryer (18); and
  a second reservoir (22) comprising a first door (45) and an automatic opening system (44) at a lower end of the second reservoir;
 a grain weighing and classification unit comprising:
  a batch flow weighing scale (27) where a first portion of the one or more grains will be weighed, while a second portion of the one or more grains will be collected by way of probes (28), classified by an automatic classifier (29), and returned to the weighing scale (27), wherein the batch flow weighing scale (27) has at the batch flow weighing scale's lower end a second door (48), wherein the second door (48) is activated by a door opening and closing device (31); and
 a grain packaging and labeling unit comprising:
  forks (33), wherein the forks position and support a packaging (34) inside a mold (55) for receiving the one or more grains;
  a fork support (32), wherein said fork support moves by one or more rails (35) connected at a base (36) of said fork support (32);
  a packing securing and sealing device (46) positioned adjacently to a bagging mold;
  an air withdrawal vacuum (24) of the packaging (34); and
  a labeler (30), wherein the labeler (30) applies a label (75) on the packaging (34).

2. The apparatus according to claim 1, wherein the cleaning unit (2) further comprises a grain director (8).

3. The apparatus according to claim 1, wherein the drying unit further comprises a ventilation component (10) and an air directing component (17).

4. The apparatus according to claim 1, wherein the one or more grains, after passing through the pair of rotary sifters (3), are directed through a chute (7) to a grain director (8), and a third portion of the one or more grains is directed to the one or more moisture measurement and classification devices (37).

5. The apparatus according to claim 1, wherein one or more impurities arising from the cleaning unit (2) are discarded by a chute (5) back to the soil.

6. The apparatus according to claim 1, wherein once the one or more grains pass through the cleaning unit (2), the one or more grains are directed by a chute (7) to the grain director (8), a third portion of the one or more grains being directed through a duct (38) to the one or more moisture measurement and classification devices (37); and wherein the one or more grains, that were not directed through the duct (38) are directed to the one or more moisture measurement and classification devices (37) conveyed through the first grain conveyor (23) to the dryer (18).

7. The apparatus according to claim 1, wherein after a first passage of the one or more grains inside the dryer (18), said grains are deposited in the reservoir (22) for measuring the moisture.

8. The apparatus according to claim 1, wherein once the required weight of the one or more grains is attained, the one or more grains are unloaded through the door (48) automatically activated by the door opening and closing device (31).

9. The apparatus according to claim 1, wherein once a desired pre-set moisture is not attained, the one or more grains from the reservoir (22) are conveyed by the second grain conveyor (19) to the upper part of the dryer (18).

10. The apparatus according to claim 9, wherein the one or more grains from the reservoir (22) are repeatedly conveyed by the second grain conveyor (19) to the dryer's (18) upper part until a desired pre-set moisture is attained.

11. The apparatus according to claim 10, wherein once the one or more grains attain the desired pre-set moisture, the door (45) is opened by way of an automatic opening system (44).

12. The apparatus according to claim 1, wherein the one or more grains are conveyed by way of the first grain conveyor (23) to said weighing and classification unit (76) and cooled to ambient temperature.

13. The apparatus according to claim 1, wherein the one or more grains, after passing through the drying unit, are carried through one or more ducts to the batch flow weighing scale (27).

14. The apparatus according to claim 1, wherein once the one or more grains attain the required weight, said grain is released through the door (48) and unloaded inside the mold (55).

15. The apparatus according to claim 1, wherein vacuum is applied to the packaging (34) by way of a duct (26) connected to said packaging (34).

16. The apparatus according to claim 1, wherein the packaged grains obtained in the grain packaging and labelling unit are unloaded through the doors (47) arranged in a lower part of the apparatus (78).

17. The apparatus according to claim 1, further comprising a reading sensor (57) coupled inside the mold (55).

18. The apparatus according to claim 1, wherein the grain packaging and labelling unit comprises a conveyor belt (42), comprising small blades (43).

19. The apparatus according to claim 1, wherein the grain packaging and labelling unit further comprises a grain director (60).

20. The apparatus according to claim 1, wherein the label (75) comprises a bidimensional barcode (QR Code) and/or a chip with a radiofrequency (RFID) sensor and/or a barcode and/or a global positioning systems (GPS) chip.

21. The apparatus according to claim 20, wherein the chip with radiofrequency (RFID) sensor comprises a grain moisture and/or pressure and/or temperature and/or vacuum sensor contained in the packaging (34).

22. The apparatus according to claim 1, further comprising solar panel boards (11) arranged on an upper surface of said apparatus (78).

23. The apparatus according to claim 1, further comprising a generator (49) for transforming the mechanical energy of the rotational shaft (13) into electric energy.

24. The apparatus according to claim 1, further comprising a shaft set (50) at a lower end of the apparatus and one or more wheels (51) connected in a rotary manner to said shaft (50).

25. The apparatus according to claim 1, further comprising a control panel (56).

26. A load monitoring and tracking system comprising:
one or a plurality of sensors arranged in a packaging and configured to measure a temperature and/or a moisture and/or a pressure and/or a vacuum property of one or more grains in the packaging, together with a location of the one or more grains; and
at least one communication module configured to receive data from said one or a plurality sensors and configured to transmit and store the data from said one or a plurality of sensors in a cloud or any high-performance repository.

27. The system according to claim 26, wherein at least one communication module comprises a processor configured to transmit the data from said one or a plurality of sensors and a wireless communications unit configured to wirelessly transmit the data from the sensor to an external computer.

* * * * *